June 25, 1929.　　　F. FRASER　　　1,718,342
SHEET GLASS SUPPORTING TABLE
Filed May 6, 1926
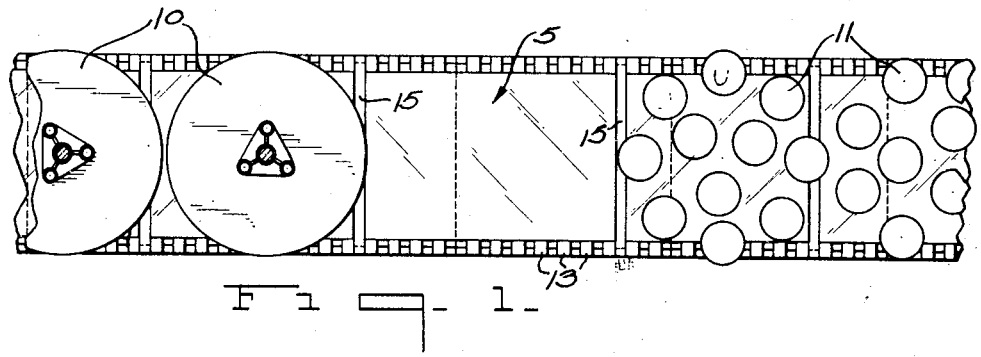
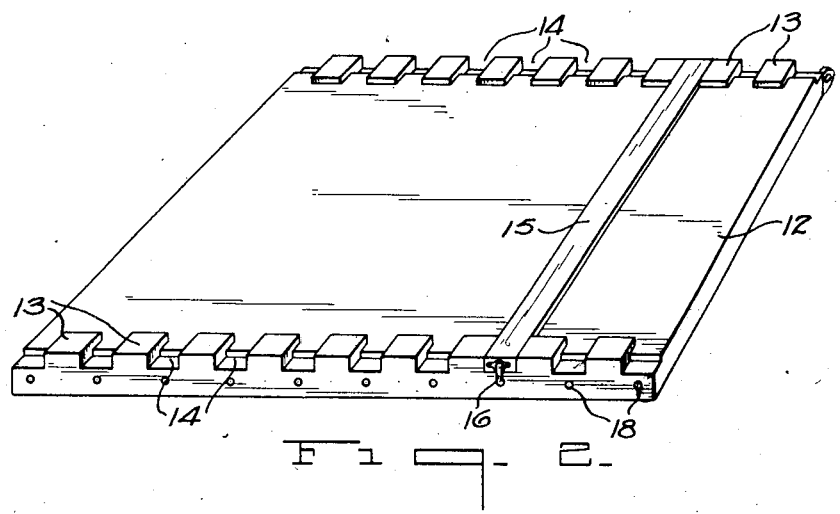
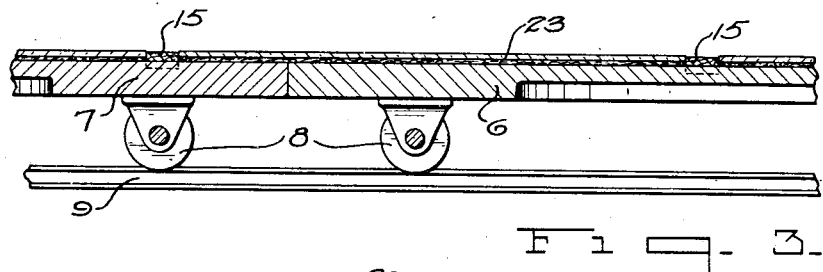
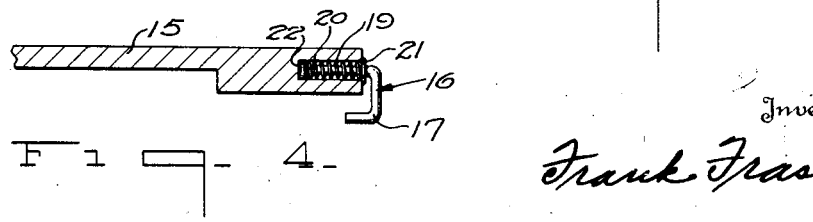
Inventor
Frank Fraser.

Patented June 25, 1929.

1,718,342

UNITED STATES PATENT OFFICE.

FRANK FRASER, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS SUPPORTING TABLE.

Application filed May 6, 1926. Serial No. 107,029.

The present invention relates to glass apparatus, and has particular reference to glass surfacing apparatus.

An important object of the invention is to provide an apparatus, particularly well adapted for the grinding and polishing of sheet glass, and more particularly to that type of apparatus wherein a sheet of glass is moved beneath a plurality of grinding and polishing machines.

Another important object of the invention is to provide an apparatus whereby a plurality of sheets of glass may be moved progressively beneath a plurality of grinding and polishing units to produce what is known in the art as plate glass.

A still further object of the invention is to provide means for supporting a plurality of sheets of glass so that they may be ground and polished, and relates particularly to means for freely supporting the sheet of glass in recesses.

Still another object of the invention is to provide a plurality of tables and means associated with the tables to form recesses thereon, in which sheets of glass can be placed, the recesses formed being dependent upon the sizes of the sheets of glass to be placed therein.

Another object of the invention is to provide an apparatus wherein a plurality of detachable movable units may be associated to form a long continuous recess, including means whereby a strip may be placed transversely of the tables to divide the long recess into a plurality of smaller recesses adapted to freely support sheets of glass so that they can be moved progressively beneath grinding and polishing machines.

Other objects and advantages of the invention will become apparent during the course of the following description.

In the drawings wherein like numerals are employed to designate like parts throughout the same, Fig. 1 is a plan view showing diagrammatically the invention in use, Fig. 2 is a perspective view of a portion of the apparatus, Fig. 3 is a vertical section thereof, and Fig. 4 is a sectional detail.

There are several processes for producing what is known in the art as plate glass. Plate glass is a sheet of glass whose surfaces have been ground and polished. It has ordinarily been customary to support a glass blank during the grinding and polishing in a bed of plaster. In some processes the sheet is supported in a bed of plaster on a rotatable table, while in other processes the sheet is supported on a table which is coupled with other tables and moved progressively beneath grinding and polishing units. After one side of the glass blank has been ground and polished, it is necessary to remove the blank from the plaster, clean the table, clean the sheet, turn the blank over, reset it in a bed of plaster, and then grind and polish the second side. This system is known in the art as the continuous system of producing plate glass because sheets are continuously passed under a plurality of series of grinders and polishers.

The present invention relates to the production of plate glass by means of the continuous system, but differs from the ordinary continuous system in that the sheet of glass is not supported during the grinding and polishing operations, by means of plaster or any other cement. On the other hand, each sheet of glass is freely supported in a recess.

In the continuous system a long table is formed by joining a plurality of short tables together. To overcome the necessity of cutting each blank to a specified length, it is an aim of the present invention to provide means where any length of glass can be freely supported in a recess, and ground and polished.

In Fig. 1, the numeral 5 designates a table in its entirety, comprising a plurality of relatively shorter tables or sections 6 and 7, shown in Fig. 3. The tables 6 and 7 are adapted to be coupled together in a manner that their upper surfaces present a continuous flat surface. The tables or tucks 6 and 7 may be supported on wheels 8, adapted to run on a track 9.

The trucks 6 and 7, coupled together to form the table 5, are movable progressively beneath a plurality of grinding heads 10 and polishing heads 11.

Fig. 2 discloses a form of table made in accordance with the present invention, and comprises a flat bottom 12 having the upstanding side portions 13. The sides 13 are notched as at 14 at intervals, the notches on opposite sides being in direct alignment. A strip 15 is adapted to be arranged transversely of the tables 6 and 7, the ends of the strip being received within the notches 14 of the sides 13. The top of the strips are adapted to be just about flush with the top of the side members. It will thus be seen that a sheet of glass may be placed upon the table 5, and the strip 15 placed in notches 14 at the end of the sheet, leaving a slight space for free movement of the sheet in the recess formed by a pair of the strips 15. As the notches 14 are relatively close together, any length of recess within the limits of the table may easily be formed by moving the strip 15 to the desired notches. As the size of the recess can be varied at will, any length of sheet can be ground and polished. This is an important feature as it is somewhat difficult to constantly produce first-class blanks in long lengths. As the sheet can be cut to remove defects before being ground and polished, the amount of poor glass ground and polished will be negligible.

To prevent accidental displacement of the strips 15, locking means 16 may be used, comprising the hooked end 17, receivable in openings 18 formed in the sides of the trucks, as shown in Fig. 2. The opposite end of the locking means 16 is received in an opening 19 in the end of the strip 15, and a spring 20 is used bearing against a plate 21 in the end 22 of the locking means 16 to hold the locking means 16 in operative position when the strip 15 is in place upon the tables.

As the tables are ordinarily formed from metal it is desirable to place a pad 23 in the recess. The pad 23 may be felt, cork, rubber, or some similar substance. The pads do not necessarily need to be the same length as the sheets of glass, as the strips can be thin enough to permit a pad to be arranged thereunder, making it possible to lay relatively long strips of pads on the tables. Of course each table may have a pad of the same length fastened in place. It is to be noticed that the sides of the tables and the transverse strip are so constructed that the sheet of glass may be subjected to the action of the grinding and polishing members, while the members do not touch the parts of said tables and strips.

It is also to be noted that the sheets of glass can overlap from one table to another without difficulty. The upper surface of the tables is a continuous flat surface capable of being divided into recesses of any desired lengths. The method of propelling the tables does not form a part of the present invention, and it is sufficient to say that the tables, when coupled together and supporting the sheets of glass in the recesses, are moved progressively beneath the grinding and polishing members.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass surfacing apparatus, a plurality of detachably associated tables having upstanding side portions, and a plurality of detachable means arranged transversely of the tables and cooperating with the side portions for forming a plurality of sheet receiving recesses.

2. In sheet glass surfacing apparatus, a plurality of detachably associated tables having notched upstanding side portions, and detachable means engaging with the notches in said side portions and arranged transversely of the table for forming with said side portions a plurality of sheet receiving recesses.

3. In sheet glass surfacing apparatus, a plurality of tables coupled together and having upstanding side portions to form a continuous recess, and a plurality of adjustable means arranged transversely of the continuous recess for dividing the recess into a plurality of relatively smaller sheet receiving recesses.

4. In sheet glass surfacing apparatus, a plurality of tables detachably associated and having upstanding side portions to form a continuous recess, and a plurality of adjustable strip members arranged transversely of the tables for dividing the continuous recess into a plurality of relatively smaller sheet receiving recesses.

5. In sheet glass surfacing apparatus, means for freely supporting a plurality of sheets of glass to be surfaced, comprising a plurality of tables having upstanding edge portions, said tables being adapted to be coupled together, and removable means arrangeable transversely of the tables for forming with the upstanding edge portions a plurality of sheet glass receiving recesses, said means being such that a recess may overlap adjacent tables.

6. In glass surfacing apparatus, a sheet glass supporting table, upstanding side portions arranged along opposite sides of the table and having notches therein and detachable members adapted to be arranged transversely of the table, the ends of said members being receivable in the desired notches of the side members, said transversely arranged members cooperating with the upstanding side members for creating a sheet glass receiving recess.

7. In glass surfacing apparatus, a sheet glass supporting table, upstanding side portions arranged along opposite sides of the table and having notches therein and detachable members adapted to be arranged transversely of the table, the ends of said members being receivable in the desired notches of the side members, said transversely arranged members cooperating with the upstanding side members for creating a sheet glass receiving recess, and means to prevent accidental displacement of the transversely arranged members.

8. In glass surfacing apparatus, a plurality of sheet glass supporting tables arranged in end to end relation, upstanding side members carried by opposite sides of the tables, the corresponding members of said tables being in horizontal alignment and detachable members arranged transversely of the tables and cooperating with the side members to create a sheet glass receiving recess, said transverse members adapted to be so arranged that the recess may extend from one table to the adjacent table.

Signed at Toledo, in the county of Lucas, and State of Ohio, this 4th day of May, 1926.

FRANK FRASER.